United States Patent [19]

Jarvis

[11] Patent Number: 5,307,584
[45] Date of Patent: May 3, 1994

[54] DEER SCENT DISPENSER AND METHOD

[76] Inventor: Robert Jarvis, Rt. 2 Box 4, Gerald, Mo. 63037

[21] Appl. No.: 98,520

[22] Filed: Jul. 28, 1993

Related U.S. Application Data

[63] Continuation-in-part of Ser. No. 944,042, Sep. 11, 1992.

[51] Int. Cl.⁵ ............................................... A01M 31/00
[52] U.S. Cl. .................................... 43/1; 239/51.5; 239/57; 239/6
[58] Field of Search ................. 43/1, 132.1; 239/51.5, 239/57, 43, 44, 6

[56] References Cited

U.S. PATENT DOCUMENTS

| | | | |
|---|---|---|---|
| 1,016,648 | 2/1912 | Snell | 239/44 |
| 2,738,225 | 3/1956 | Meek | 239/55 |
| 2,959,354 | 11/1960 | Beck | 43/2 |
| 3,515,302 | 6/1970 | Curran | 239/57 |
| 4,523,717 | 6/1985 | Schwab | 239/56 |
| 4,621,768 | 11/1986 | Lhoste et al. | 239/44 |
| 4,969,599 | 11/1990 | Campbell | 239/57 |
| 5,048,218 | 9/1991 | Stewart | 43/1 |
| 5,083,708 | 1/1992 | Walters | 239/55 |
| 5,094,025 | 3/1992 | Daniels | 43/1 |

Primary Examiner—Paula A. Bradley
Assistant Examiner—Jeanne M. Elpel
Attorney, Agent, or Firm—Robbins & Robbins

[57] ABSTRACT

A deer scent dispenser is provided for use in the field to attract deer. The dispenser is comprised of a cylindrical container provided with a bottom reservoir for liquid deer scent. The upper part of the container has plastic screen walls which hold a wick of absorbent biodegradable rayon, cotton or the like. The wick is supported upon a spindle and spaced from the interior wall of the container to provide for maximum diffusion and avoid dripping of scent on the wall. A cap closes the container at the top and a loop or bail detachable at one end for fitting over a support such as a branch is provided for supporting the container. The screen wall of the container has openings of a sufficient size to provide visual inspection for the condition of the wick and the reservoir and to receive a probe for moving the wick to ascertain the level of the liquid. The reservoir may be filled with liquid from the top by opening the cap or through the screen by slightly tilting the container.

9 Claims, 2 Drawing Sheets

ABC
5,307,584

DEER SCENT DISPENSER AND METHOD

RELATED APPLICATION

This application is a continuation-in-part application Ser. No. 07/944,042, filed Sep. 11, 1992.

BACKGROUND OF THE INVENTION

In the past, liquid deer scent has been commonly employed by dispensing droplets of the liquid in the area where it is desired to attract deer. The dispensing has conventionally been employed by the use of a squeeze bottle or the like. Such application has required time and skill in choosing the area and to some extent has been haphazard.

To improve the efficiency of providing deer scent, there have also been provided various devices employing apparatus holding a liquid deer scent with wicks which provide a wind borne odor of the deer scent by evaporation of the liquid from the wick. While such devices have been useful, there has been a problem in providing support of the wick, visual inspection of the supply of liquid deer scent remaining in the devices and ready refilling in the field where cold and inclement weather may make any manual manipulations difficult and awkward.

SUMMARY OF THE INVENTION

By means of this invention, there has been provided a deer scent dispenser that may be simply and easily employed in the field by hunters or others who wish to attract deer to the area where the dispenser is placed.

The dispenser is in the form of a container having a bottom portion that serves as a reservoir for the liquid deer scent. An upper screen portion serves to contain a porous wick, such as absorbent bulk biodegradable rayon, cotton or the like which, by evaporation serves to dispense or diffuse the deer scent odor in 360° in any direction in which the wind is blowing.

A cap at a top opening serves to close and open the dispenser for filling as desired.

For ease of inspection of the condition of the wick and the level of the liquid deer scent, the plastic screen is of a size to permit visual inspection from any angle of the interior of the container. The screen has small openings of a size that permit a probe, such as a rod or twig to move the wick for inspection and also to permit filling of the reservoir when needed. This is effected by slightly tilting the container and charging liquid through the screen to fill the bottom reservoir.

The wick is generally congruent with the interior side walls of the container and when dry may be closely spaced from the interior side walls to avoid contact and loss of fluid by dripping along the exterior. When wetted with liquid deer scent the wick shrinks away from the interior screen wall and is retained by a spindle in upright relation. A central spindle upon which the wick is impaled provides for a stable support of the wick and aids to maintain the wick upright to avoid slumping and outward movement of the wick.

A bail is provided by a self levelling flexible strap at the top of the container. The bail may be removed at one end in order to be easily fitted around a small branch or the like.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
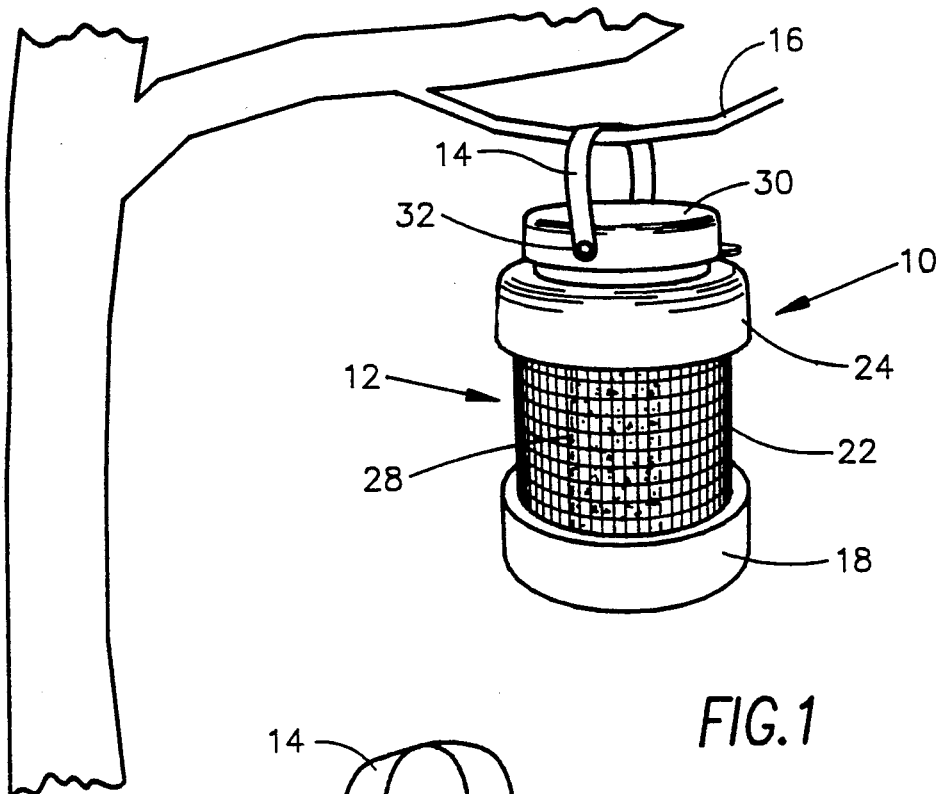
FIG. 1 is a pictorial view of the dispenser.

The deer scent dispenser of this invention is generally indicated by the reference numeral 10 in FIGS. 1-4. It is comprised of a generally cylindrical deer scent and wick container 12 adapted to be suspended by a support loop or bail 14 from a limb 16 of a tree as shown in FIG. 1.

Figure 2:
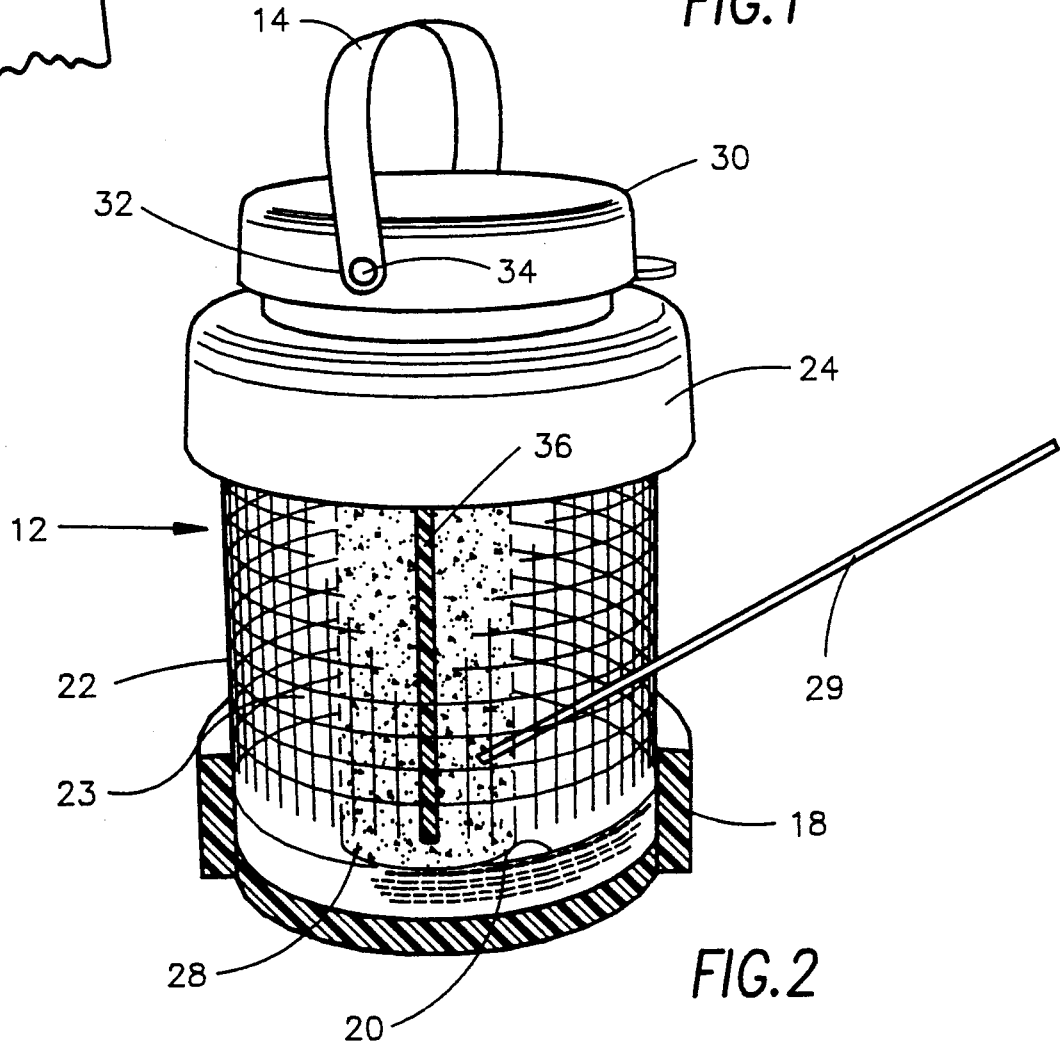
FIG. 2 is a view similar to FIG. 1 partially broken away to show inspection of fill.

The container 12 is generally cylindrical although it may be of box-like form or the like and may be made of plastic, metal or a combination if desired. The container has a cup-shaped shallow reservoir 18 which may be filled with liquid deer scent to a level 20 as shown in FIG. 2.

The container 12 has a side wall 22 comprised of a plastic screen material having openings 23 and a top 24 having an opening 26 through which the reservoir may be charged with the liquid deer scent. The entire container where desired may be integral. A porous wick 28 is provided in the center of the container. The openings 23 are of a size sufficient to permit insertion of a probe 29 to move the wick to provide observation and to permit filling the reservoir from the exterior when the container is slightly tilted. The wick may be of bulk surgical biodegradable rayon or cotton in the form of a loose wad or the like. Other wicks of various absorbent material may be employed as desired.

A cap 30 is supported at the top 24 of the container. The cap fits snugly over the top with a friction fit and may easily be opened and closed.

In order to carry the container and support it from a limb or the like, the support loop or bail 14 is connected to opposite sides of the cap or as desired may be connected at the top side wall of the container. The bail may be constructed of a flexible plastic smooth sided strap and has sufficient width to slide on a branch and be self levelling as distinct from a loop of wire or string which might tend to bite into the bark and support the container at an angle. In order to fit around a branch or the like, one end of the bail is provided with an opening 32 which can be fitted over a stud 34 on the cap whereby the bail may be easily connected and disconnected and moved around the branch for support.

The wick 28 may preferably be in the form of a loosely fibrous ball such as that commonly sold in cylindrical form as surgical cotton or biodegradable rayon which, if discarded in the field, degrades so as to leave no waste with the passage of time. In order to support the wick in the central portion of the container and prevent movement against the screen which might cause dripping to the outside and loss of fluid, an upright spindle 36 connected to the bottom of the container is provided. The wick is impaled upon the spindle which retains and supports the wick with the exterior of the wick spaced from the screen walls. The spindle provides a fixed support for the wick and prevents slumping and spreading against the interior screen wall.

USE

The deer scent dispenser of this invention is designed for efficient and easy use in the field. When the reservoir 18 is filled with liquid deer scent, the wick 28 by vaporization can pass the odor 360° in any direction of the wind. Even in still periods, the open screen side wall will pass the odor completely around the container where the scent is picked up by the sensitive nostrils of any deer in the area.

Figure 3:
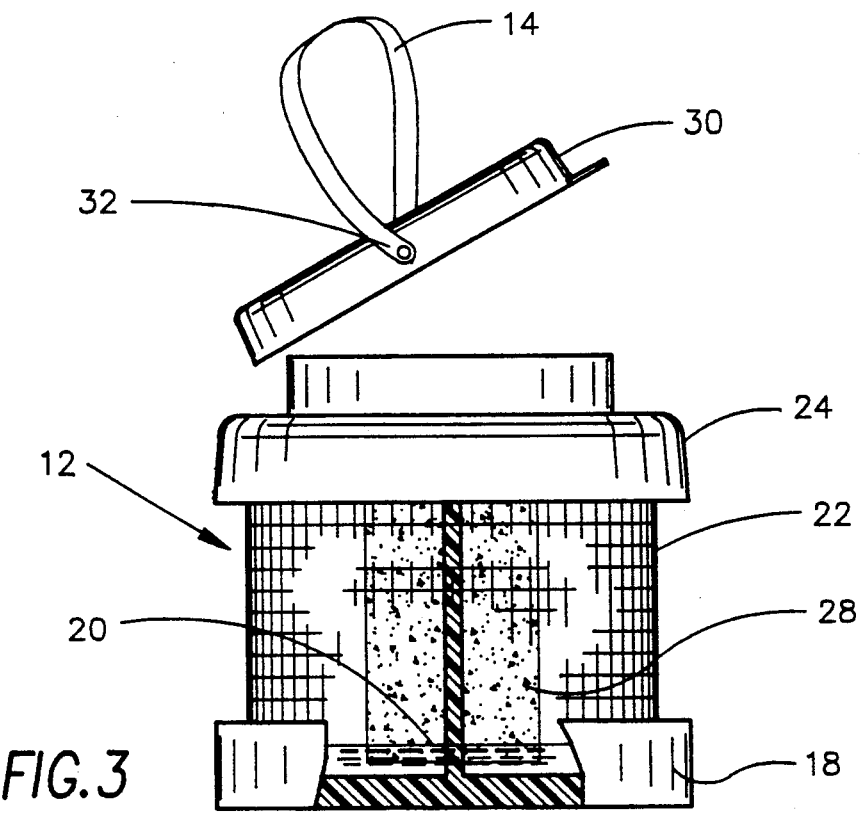
FIG. 3 is a view partially broken away in front elevation showing the cap open and partially broken away to show the wick and liquid level.
Figure 4:
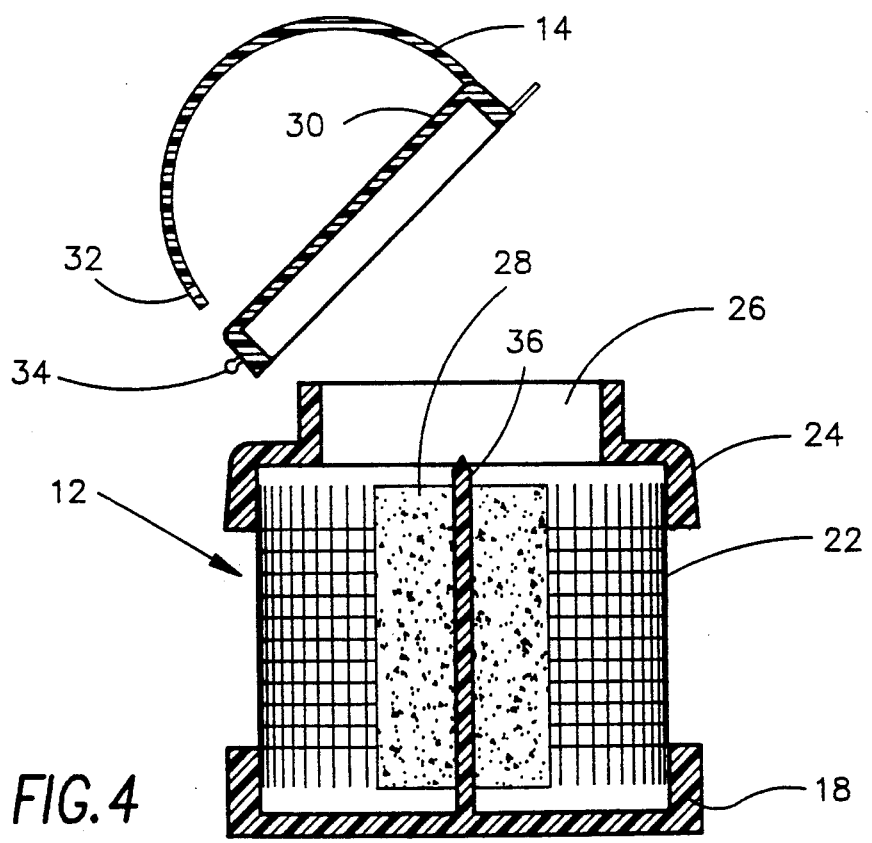
FIG. 4 is a view partially in vertical section and partially broken away taken through the vertical axis of the dispenser.

In initial use, the reservoir 18 is simply filled as shown in FIGS. 2 and 3 with the liquid deer scent by opening the cap 30 and filling with the liquid deer scent to the level 20 and placing the cotton wick 28 over the spindle 36 in the upper portion of the container with the bottom positioned in contact with the liquid deer scent in the reservoir. The cap is then closed and the container is placed in the desired location such as by support from a tree branch or limb by the loop or bail 14. The bail is easily detached from the container, fitted around the branch and reattached to the container in level position by the interfit of the bail hole 32 over the stud 34.

When the container is desired to be inspected in the field to determine whether liquid deer scent needs to be added the probe 29 as shown in FIG. 2 may be inserted through an opening 23 in the screen wall to push the wick to one side to observe the liquid level. Should additional liquid need to be added, the container is slightly tilted. This positioning enables the liquid to be poured or dispensed by droplets from a conventional squeeze tube dispenser through the screen wall to add the proper level to the reservoir.

The capacity to check the condition of the wick and the liquid level in the field without opening the cap, is of significant value due to the short time required and removal of the necessity of opening the cap which at times, in inclement weather, may be covered with snow, iced over or frozen.

The deer scent dispenser may be easily employed and at low cost in the field. Its rugged and simple construction lends itself to widespread and efficient usage.

Various changes and modifications may be made within this invention as will be apparent to those skilled in the art. Such changes and modifications are within the scope and teaching of this invention as defined in the claims appended hereto.

What is claimed is:

1. A deer scent dispenser for use in the field to attract deer, said dispenser comprising a container having a bottom reservoir receiving a liquid deer scent, said reservoir being defined by a bottom wall and a solid peripheral side wall portion extending vertically a sufficient distance to retain said liquid deer scent, vertical side wall means having openings providing for passage of deer scent therethrough, a cap fitting on the top of said side wall means and adapted to be opened and closed over a top opening in said container, said top opening providing for filling the bottom reservoir of said container with said liquid deer scent, a porous wick material extending from the bottom reservoir portion of said container to said side wall means, a bail member having opposite ends connected to upper and opposite side portions of the container, said bail being of a size to be fitted over a small branch to support the container, said wick material being in a body shape spaced from interior side walls of said screen and a vertical spindle connected to said bottom wall fitting through said body to retain said body against movement within said container.

2. The deer scent dispenser of claim 1 in which the wick is a porous biodegradable fibrous ball impaled upon said spindle.

3. The deer scent dispenser of claim 1 in which the bail is comprised of a flexible plastic band hingedly connected at an end to said cap and at an opposite end to an opposite portion of said cap by removable connecting means whereby said opposite end of the bail may be removed from the cap, fitted around a branch and connected to said cap for support of the deer scent dispenser from the branch.

4. The deer scent dispenser of claim 1 in which said side wall means is comprised of a screen having openings of a sufficient size to receive a probe to push said wick to one side to permit visual inspection of the extent of the level of the liquid deer scent and to permit adding liquid deer scent through the screen by slightly tilting the container.

5. The deer scent dispenser of claim 1 in which the wick is a porous biodegradable fibrous ball impaled upon said spindle, the bail is comprised of a flexible plastic band hingedly connected at an end to said cap and at an opposite end to an opposite portion of said cap by removable connecting means whereby said opposite end of the bail may be removed from the cap, fitted around a branch to provide self levelling and connected to said cap for support of the deer scent dispenser from the branch and said side wall means is comprised of a screen having openings of a sufficient size to receive a probe to push said wick to one side to permit visual inspection of the extent of the level of the liquid deer scent and to permit adding liquid deer scent through the screen by slightly tilting the container.

6. A method for dispensing deer scent from a deer scent dispenser in the field to attract deer, said dispenser comprising a container having a bottom reservoir, substantially filling said reservoir with a liquid deer scent, placing a porous wick in said reservoir, said dispenser having vertical side wall means having openings providing for passage of deer scent therethrough, said vertical side wall means being comprised of a screen having small openings, adding liquid deer scent through the screen by slightly tilting the container and suspending the dispenser from a support in the field by a bail member having opposite ends connected to opposite portions of the container.

7. The method of claim 6 in which the bail member is a plastic band hingedly connected at one end to said dispenser and at an opposite end is detachable from said dispenser, supporting said bail member over a branch by detaching one end of the bail member, fitting it over a limb and attaching it to said dispenser to hang said dispenser from the support in self levelling relation.

8. The method of claim 6 in which the inspection is carried out by pushing said wick to one side to permit visual inspection of the extent of the level of the liquid deer scent.

9. The method of claim 8 in which the bail member is hingedly connected at one end to said dispenser and at an opposite end is detachable from said dispenser, supporting said bail member over a branch by detaching one end of the bail member, fitting it over a limb and attaching it to said dispenser to hang said dispenser from the support in self levelling relation.

* * * * *